United States Patent [19]

Tischer et al.

[11] 4,148,958

[45] Apr. 10, 1979

[54] "BREATHING" LINING MATERIAL HAVING A SHAPING EFFECT COMPOSED OF AN ORIENTED FIBER LAYER AND A RANDOMLY ORIENTED FIBER LAYER

[75] Inventors: Kurt Tischer, Hemsbach; Walter Föttinger, Weinheim, both of Fed. Rep. of Germany

[73] Assignee: Firma Carl Freudenberg, Weinheim, Fed. Rep. of Germany

[21] Appl. No.: 898,257

[22] Filed: Apr. 20, 1978

[30] Foreign Application Priority Data

May 18, 1977 [DE] Fed. Rep. of Germany ....... 2722429

[51] Int. Cl.² .................... A41D 27/02; A41D 27/06; B32B 5/12; B32B 7/14
[52] U.S. Cl. .......................................... 428/196; 2/9; 2/7; 2/272; 428/200; 428/219; 428/235; 428/236; 428/294; 428/340; 428/347
[58] Field of Search ............... 428/109, 107, 196, 198, 428/200, 219, 235, 236, 347, 294, 340; 2/272, 97

[56] References Cited

U.S. PATENT DOCUMENTS

| 3,098,235 | 7/1963 | Gusman | 2/97 |
|---|---|---|---|
| 3,598,689 | 8/1971 | Feffer et al. | 428/107 |

*Primary Examiner*—J. C. Cannon
*Attorney, Agent, or Firm*—Sprung, Felfe, Horn, Lynch & Kramer

[57] ABSTRACT

A breathable lining and shaping material especially suited for garments, comprising a nonwoven layer of randomly arranged fibers superposed on a nonwoven layer of oriented fibers, means holding together the fibers of each layer and holding the layers together, and an outer binder imprinted on the outer face of the oriented fiber layer, the weight of the outer binder being at most 50% of the material weight, the length to width strength ratio of the randomly arranged fiber layer ranging from about 4:1 to 1:4. Advantageously a heat activatable adhesive is provided at spaced locations on the outer face of the randomly arranged layer, whereby the material can be joined to the underside of a garment by hot pressing. The outer binder on the outside of the oriented fiber layer preferably is printed in a regular pattern to ensure that all fibers are tied down by bonds at multiple points.

13 Claims, No Drawings

"BREATHING" LINING MATERIAL HAVING A SHAPING EFFECT COMPOSED OF AN ORIENTED FIBER LAYER AND A RANDOMLY ORIENTED FIBER LAYER

BACKGROUND

The invention concerns a "breathing" lining material having a shaping effect, especially for articles of clothing. The lining material combines the properties of conventional linings and interfacings such that only a single textile sheet material needs to be incorporated into the article of clothing.

It is common to provide interfacing materials in articles of clothing which need to be stiffened. Particularly desirable for this purpose are fixative interfacings, i.e., interfacings which have an adhesive on the surface and thus can be bonded tightly to the face material. Additionally, a lining material is also incorporated for the purpose of improving the wearing properties.

Fixative interfacings consist usually of nonwoven fabric. Random fiber nonwovens and oriented fiber nonwovens are known, as are combinations of both types of nonwovens. The function of an interfacing consists, for example, of shaping the front of an article of clothing, equalizing fatigue phenomena in the facing material, preventing deformation of the article which may be caused by wearing and by chemical cleaning, and smoothing wrinkles and creases which might form in the face material due to wearing stresses. The interfacing must therefore have a certain minimum bulk, a soft, textile feel, good shaping power and recovery capacity, and a great ability to adapt its shrinkage characteristics to the face material. The nonwoven fabric can provide these properties to a great extent if the fibers, the binding agent and the technique used in laying up the fibers are appropriately adapted to the purpose for which the face material is to be used as well as to the face material itself.

The lining material has entirely different purposes in an article of clothing. It is to be as dense and smooth as possible so as to enable the article of clothing to be put on and taken off easily, slipping easily over the underclothing or the skin, and yet producing as little friction as possible. The smooth and dense surface of the lining must furthermore protect the interfacing and the face material against wear, and yet it must have an esthetically pleasing appearance.

It has been found disadvantageous that the lining materials used hitherto have physiologically undesirable characteristics in regard to clothing. The feeling of comfort in clothing is due to the microclimate between the skin and the outer garments. This, in turn, depends largely on the humidity of the air in the particular area. The humidity of the air must be assured by a high degree of moisture transport (sweat transport) through all layers of the clothing. The transport of moisture takes place in a textile material mainly on the surface of the fibers, resulting in a wick effect. This effect is produced all the better the more greatly the fibers are oriented in the transport direction, i.e., perpendicularly to the body surface. Textiles lend themselves poorly to moisture transport when they consist, not of fibers, but of endless filaments, and when the filaments are of a highly bidirectional orientation. This, however, is the case with conventional woven or knit lining materials, which do lie smoothly on the skin or undergarments, but have more or less great deficiencies with regard to moisture transport.

In the transport of moisture, furthermore, the distance between the different textile layers, i.e., for example the distance between the face material, the interfacing and the lining, reduces the amount of diffused water vapor, thus increasing the humidity of the microclimate and having a negative influence on the feeling of comfort.

A sandwich of several layers and a reduction of the distance between these layers is thus bound to produce an improvement and acceleration of moisture transport, improve the microclimate at the surface of the skin, and increase the feeling of comfort.

THE INVENTION

The invention is addressed to the problem of developing a "breathing" lining material which will combine optimum moisture transport with a shaping action. The object is to assure that the lining material will provide an optimum moisture transport in all layers, i.e., in the face material, in the interfacing, in the lining and in the undergarments.

A lining material is proposed which is simultaneously an interfacing material and combines the properties of both of these formerly separate, known textile materials. An optimum shaping action is achieved along with an optimum moisture transport, and therefore the microclimate is favorably influenced to an extent unknown hitherto.

According to the invention, a breathing lining material having a shaping effect is proposed, which is characterized by a random fiber nonwoven fabric which has a stiffening effect and is provided on one side with an adhesive composition, and which is bonded by a binding agent or by thermoplastic binding fibers to an oriented fiber nonwoven fabric which is provided with an imprint of binding agent and forms the lining, the length to width strength ratio of the random fiber nonwoven fiber varying between 4:1 and 1:4 and the weight of the binding agent imprint on the lining corresponding to the weight of the material.

The lining material of the invention consists accordingly of the combination of a random fiber nonwoven fabric serving as an interfacing, with a nonwoven fabric of oriented, especially longitudinally oriented, staple fibers serving as lining, and on the basis of its structure it has good physiological properties hitherto unattained in lining materials. The known desirable characteristics of random fiber nonwoven material as interfacing are combined in accordance with the invention with the properties of oriented fiber nonwoven material favorable to moisture transport, the oriented fiber nonwoven replacing the previously customary lining materials. By the bonding together of the two nonwovens in accordance with the invention, the specific weight of the oriented fiber nonwoven material can be kept exceedingly low. For example, while a conventional lining has a specific weight of about 65 to 130 grams per square meter, it is possible in the case of the laminated material of the invention to reduce the oriented fiber content to a fraction of this weight.

It is known that the moisture transfer resistance of a textile material increases as the thickness increases. The moisture transfer thus diminishes accordingly. With the laminated material proposed in accordance with the invention, it is possible to use an oriented fiber nonwoven of very low weight. This nonwoven is thus very much thinner than conventional lining materials and transports the moisture much more easily and rapidly, so that a substantially more pleasant microclimate results. The laminate represents an important advance with regard to clothing physiology.

The combination of the interfacing nonwoven and the lining material in a single product provides an important facilitation and simplification in the manufacture of clothing. Hitherto, two or more products have always had to be used as interfacing and lining in the manufacture of clothing. The disadvantages of this known method lie on the one hand in the complex manufacture of the article of clothing and on the other hand in possible irregularities in the end products due to flaws in the assembling together of the various elements. Since interfacings and linings have hitherto had to be laid out and cut separately and sewed and bonded together, the result has been considerable cost and the risk of numerous manufacturing defects. The combination of lining and interfacing in accordance with the invention avoids all of the previously known disadvantages.

It is desirable for both the random fiber nonwoven serving as the interfacing and the nonwoven composed of oriented fibers serving as lining to contain natural and/or synthetic staple fibers of 20 to 100 mm length. Preferred are fibers of about 30 to 80 mm length.

A more or less great content of well crimped fibers in the random fiber nonwoven is not essential, but in most cases it is desirable. The number of crimps in these fibers should amount to about 15 to 25 crimps per centimeter. The fineness of the fibers is variable and ranges generally between about 1.2 and 20 dtex. The weight of the random fiber nonwoven ranges from about 10 to 100, preferably about 15 to 60, g/m². The length to width strength ratio of the random fiber nonwoven is to be within the limits of about 4:1 to 1:4.

The coherently oriented nonwoven serving as lining material consists preferably of longitudinally laid fibers. This fabric must correspond in its construction to conventional lining materials with regard to tightness and smoothness. The oriented nonwoven is applied to the surface of the random nonwoven and consists desirably of fibers of a length of about 20 to 100 mm, preferably about 30 to 80 mm. Any natural and/or synthetic fiber is suitable. Preferred are fine fibers of about 1.2 to 4.4 dtex. In most cases it is desirable that the fibers be slightly crimped, the number of crimps being approximately between 6 and 14 crimps per centimeter. The weight of the fiber sliver ranges from about 5 to 45, and preferably about 10 to 25, g/m².

The random fiber nonwoven and the oriented nonwoven are bonded tightly together. The bonding of the fabrics to one another can be accomplished either by means of known thermoplastic binding fibers or else by means of an also known binding agent, e.g., a polyacrylate, a copolymer of butadiene and acrylonitrile or of butadiene and styrene or the like. In the preparation of the laminate it has been found desirable to provide the two superimposed fabrics with the binding agent by means of a common impregnation in a one-step process. However, other impregnation methods can be used, such as spraying, foam impregnation or saturation. When thermoplastic binding fibers are also used, they can bring about the bond through the action of heat and pressure. If particularly stable laminates are desired, it is desirable additionally to needle the two fabrics together. In the case of less firm laminates, the bonding can be performed also by needling alone. It is also possible to produce the bond by a separate consolidation of the two nonwovens, followed by lamination.

The oriented nonwoven serving as lining has, on the side facing the wearer's body, an imprint of binder. Suitable binders are known synthetic resins. The area covered by the binder ranges from about 10 to 99%, preferably about 30 to 50%, of the total area. Regular or irregular patterns are suitable if they assure that at least 90%, and preferably 98 to 99% of all fibers, are additionally bonded at least three times and preferably about five to seven times. In the case of very fine patterns an even greater number of bonds is possible.

Particularly suitable are regular geometrical patterns which comply with the above-stated conditions, and in which the individual figure C is equal to A divided by 2B, wherein A represents the fiber length in millimeters, B the number of bonds required per fiber, and C the maximum size of the individual figure measured in the longitudinal direction in millimeters (repeat).

By the additionally applied amount of binder, the fibers on the surface are bonded as intensively as possible, while the product will retain its soft, textile feel. Too much applied binder would render the lining paper-like and hard. For this reason it is important that the weight ratio of the imprinted binder to the weight of the nonwoven fabric not exceed 1:1.

An adhesive composition is provided in a known manner on the back of the random fiber nonwoven serving as the interfacing. Polyamides, polyethylenes, polyvinyl chlorides, polyvinyl acetates and mixtures thereof are suitable as binding compositions. The adhesive composition can be applied either by the powder sprinkling method or by means of printing machines.

EXAMPLE

The following example will serve to explain the invention.

A random fiber sliver having a specific weight of 22 grams per square meter is covered with a fiber sliver made from longitudinally oriented fibers having a specific weight of 10 g/m². The two slivers are together impregnated with a commercial acrylate (e.g., Acronal 35 D of BASF) by the foam impregnation method. The specific weight of the binding agent amounts to 11 g/m².

For the random fiber fabric a fiber mixture of the following composition is used:
 50% of highly crimped nylon, 3.3 dtex./51 Number of crimps per cm approximately 20
 25% of polyester fibers 3.3 dtex/60
 25% of viscose fibers 1.7 dtex/40

The fiber mixture of the longitudinal sliver is composed as follows:
 60% of nylon fibers 1.7 dtex/40 Number of crimps per cm 5 to 10
 20% of polyester fibers 1.7 dtex/40
 20% of viscose fibers 1.3 dtex/40

The fabric consolidated by foam impregnation is imprinted with a pattern on the side of the longitudinal sliver by means of a rotary printing machine. The printing paste consists of a conventional pigment binder, a dye, and a commercial acrylate thickener. The deposit after drying amounts to approximately 8 g per sq m.

The random fiber side of the material is provided with a commercial ternary copolyamide having a melting point of 125° C. by means of a powder dotting machine. The deposit amounts to 15 g per sq m.

The laminate material obtained in the manner described above can be used in any desired manner for the lining and stiffening of articles of clothing, only a single working procedure being required.

The composite lining can be joined to a men's jacket fabric by placing the random fleece face against the underside of the jacket fabric and pressing with a Hoffman press.

It will be appreciated that the instant specification and example are set forth by way of illustration and not limitation, and that various modifications and changes may be made without departing from the spirit and scope of the present invention.

What is claimed is:

1. A breathable lining and shaping material especially suited for garments, comprising a nonwoven layer of randomly arranged fibers superposed on a nonwoven layer of oriented fibers, means holding together the fibers of each layer and holding the layers together, and an outer binder imprinted on the outer face of the oriented fiber layer for the purpose of bonding the oriented fibers of the non-woven layer together, the weight of the outer binder being at most 50% of the material weight, the length to width strength ratio of the randomly arranged fiber layer ranging from about 4:1 to 1:4.

2. A material according to claim 1, wherein the fibers range in length from about 20 to 100 mm.

3. A material according to claim 1, wherein the fibers of the randomly arranged layer are of about 1.2 to 20 dtex and have about 15 to 25 crimps per centimeter.

4. A material according to claim 1, wherein the weight of the randomly arranged fibers is at least about 10 g/m$^2$.

5. A material according to claim 1, wherein the fibers of the oriented layer are of about 1.2 to 4.4 dtex and have about 4 to 16 crimps per centimeter.

6. A material according to claim 1, wherein the weight of the oriented fibers is from about 5 to 45 g/m$^2$.

7. A material according to claim 1, wherein the holding means at least in part comprises needled fibers extending transversely.

8. A material according to claim 1, including a heat activatable adhesive at spaced locations on the outer face of the randomly arranged layer, whereby the material can be joined to the underside of a garment by hot pressing.

9. A material according to claim 1, wherein the outer binder covers at least about 10% but less than all of the surface.

10. A material according to claim 1, wherein the outer binder covers about 30 to 50% of the surface.

11. A material according to claim 10, wherein the outer binder is imprinted on a regular pattern and each individual figure has the size $C = A/2 B$ wherein C is the maximum length in mm of the repeat in longitudinal direction, A is the fiber length in millimeters and B is the number of bonds per fiber.

12. A material according to claim 8 laminated by the heat activatable adhesive to the underside of a garment, the outer binder of the lining material being imprinted over about 30 to 50% of the surface of the oriented layer in a regular pattern and each individual figure has the size $C = A/2 B$ wherein C is the maximum length in mm of the repeat in longitudinal direction, A is the fiber length in millimeters and B is the number of bonds per fiber.

13. A material according to claim 12, wherein the fibers range in length from about 30 to 80 mm, the fibers of the randomly arranged layer are of about 1.2 to 20 dtex and have about 15 to 25 crimps per centimeter, the weight of the randomly arranged fibers is at least about 10 g/m$^2$, the fibers of the oriented layer are of about 1.2 to 4.4 dtex and have about 4 to 16 crimps per centimeter, and the weight of the oriented fibers is from about 5 to 45 g/m$^2$.

* * * * *